United States Patent
Kirkby et al.

(10) Patent No.: US 6,556,548 B1
(45) Date of Patent: Apr. 29, 2003

(54) METHOD OF ALLOCATING RESOURCES IN A TELECOMMUNICATIONS NETWORK

(75) Inventors: Paul Anthony Kirkby, Old Harlow (GB); Martin Biddiscombe, Houslow (GB); Subramanian Sabesan, Soth Harrow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/368,275

(22) Filed: Aug. 3, 1999

(30) Foreign Application Priority Data

Aug. 7, 1919 (GB) .............................................. 9817270

(51) Int. Cl.[7] .............................................. H04B 7/212
(52) U.S. Cl. ...................... 370/322; 370/322; 370/468; 370/331; 370/355; 370/345
(58) Field of Search ................. 370/95.1, 230, 370/232, 233, 234, 322, 395.2, 468, 331, 355, 348; 379/114.01–114.11; 455/13.1

(56) References Cited

U.S. PATENT DOCUMENTS 5,258,979 A * 11/1993 Oomuro et al. ............ 370/95.1
5,699,355 A * 12/1997 Natarajan ................... 370/322
5,749,044 A *  5/1998 Natarajan ................... 455/13.1

OTHER PUBLICATIONS

"Charging and Rate Control for Elastic Traffic", Frank Kelly, University of Cambridge.

* cited by examiner

Primary Examiner—Dang Ton
Assistant Examiner—Robert W. Wilson
(74) Attorney, Agent, or Firm—Barnes & Thornburg

(57) ABSTRACT

The Invention provides a distributed resource allocation Method. The distributed resource allocation method is based on the concept of proportional fairness. In this method, users express their willingnesses to pay to the local distributed controller which is associated with those users. The bandwidth allocated to each user is determined by the local controller with which they are associated and the allocation takes into account the relative demands on all the resources in the network and the time taken for those demands to reach the distributed local controllers. The distributed controllers each use only locally available information at their respective nodes, but take into account the delays between nodes. The locally available resource (i.e. bandwidth) is divided in proportion to the willingnesses to pay expressed by the various users entering their particular node. On a ring (and in other networks where the only place that traffic streams are multiplexed is at the periphery) this guarantees that no data will be lost (due to cell/packet collision) once it has been launched.

5 Claims, 12 Drawing Sheets

Number of time clicks, 4 clicks = 1 cycle

METHOD OF ALLOCATING RESOURCES IN A TELECOMMUNICATIONS NETWORK

FIELD OF THE INVENTION

The present invention relates to a method of allocating to users shared resources in a telecommunications network. It is particularly directed at allocating resources such as transmission bandwidth in a network handling a mixture of traffic types such as voice and data by means of a resource allocation method which takes account of a user's stated willingness to pay for use of network resources.

BACKGROUND OF THE INVENTION

In any communications network where there is competition between users for resources, whether those resources are bandwidth, switching capacity, buffer occupancy or other resources, there must be an agreed strategy for dividing those resources when the combined demand from the users exceeds the network resource capacity. Historically, different strategies have been developed for different network and traffic types, and their behaviour under varying load conditions is generally understood. However neither of the two main strategies, call-blocking for circuit-switched, constant bit rate, real-time applications; bit rate reduction and packet/cell loss for packet-switched, variable bit rate, non-real-time applications, are particularly suitable for use in networks which carry mixtures of both of these traffic types together with other types, such as real-time video, which may require variable bit rates for real-time applications.

Another shortcoming of these approaches is their failure to recognise that different users place different, subjective values on their communications and that the value an individual user places on his communications may vary. The result of this is that when the network is congested, a user who wishes to engage in what he perceives as high value communication, for which he would be prepared to pay a significant premium if doing so guaranteed him access and/or a better quality of service, may be blocked (circuit-switched) or have his communication significantly delayed, or reduced in quality (packet switched) by other users whose communication is of lower value.

The issues of charging, rate control and routing for a communications network carrying elastic (data) traffic, such as an ATM network, are discussed in a paper authored by Frank Kelly entitled "Charging and Rate Control for Elastic Traffic" published in European Transactions on Telecommunications, volume 8(1997), pages 33–37. This paper introduces the concept of allocating a resource in a proportionally fair manner. If all users are willing to pay the same price per unit bandwidth then the proportionally fair distribution of a network resource is given by the set of traffic flows $x_s$ that satisfy the inequality:

$$\sum_{s \in S} \frac{x_s^* - x_s}{x_s} \leq 0 \quad (1)$$

for all alternative feasible sets of flows $x_s^*$ where S is the set of source-sinks s. A source-sink comprises a connection across a network between an ingress node and a destination node. In other words, a source-sink comprises a route across the network. If users offer different willingness to pay values, then each term in the sum in equation 1 is scaled by that value, giving:

$$\sum_{s \in S} \frac{m_s(x_s^* - x_s)}{x_s} \leq 0 \quad (2)$$

where $m_s$ is the stated willingness to pay associated with source-sink s.

This is equivalent, if the users' perceived benefit from the bandwidth they are allocated is proportional to the log of the bandwidth, to finding the set of flows $x_s$ that maximise the equation $$\sum_{s \in S} m_s \ln x_s \quad (3)$$

subject to the constraint that none of the network resources should be over-utilised.

A consequence of selecting the proportionally fair traffic distribution is that a network resource will only be under-utilised if increasing its utilisation (by increasing one or more of the flows through the resource) has a net negative effect on the total user utility, as defined in equation 3. If a given resource is used by a flow which only uses that resource, then the proportionally fair traffic distribution will necessarily fully utilise that resource—since if the resource were not fully utilised, the flow through it which only used that resource could be increased without any 'knock-on' effect on other users' flows. This would result in an increased total user utility, contradicting the claim that the previous set of flows had resulted in maximum user utility.

However, in an arbitrary network, there will be several alternative routes between any given pair of nodes. In general, proportional fairness criteria alone are unable therefore to determine which routes or combinations of routes will result in maximum user utility—the utility function described in equation 3 may be maximised by several distinct sets of flows which result when different routing options are selected. Consequently, some other criteria are necessary to determine which of the equivalent sets of flows should be implemented.

A crude method of subjecting users' communications in a telecommunications network to some sort of value consideration is to set different charging rates (tariffs) for different types of calls and for predefined periods. More often, this results in increased network operator revenues but does exert some influence on users' call behaviour particularly with respect to expected periods of high demand closely matching or exceeding network capacity. However, this method is merely an extension of the known strategies of call blocking and bit rate reduction and does not result in a proportionally fair allocation of network resources.

The bandwidth and Quality of Service (QoS) requirements of different calls can impose greatly differing loads on the network. Usage-sensitive charging can be employed to ensure that call charges properly reflect the loading on the network. Charging more heavily at times of peak load provides an incentive for customers to prioritise their traffic appropriately. An efficient charging method should enable customers to predict their costs and network operators to predict their revenues. However, in a multi-service environment charging methods become complex in order to ensure that charges suitably reflect the loads that calls impose on the network by virtue of their characteristics and QoS requirements. The development of such methods raises fundamental questions about how to characterise network load, to what extent should customers be involved in declaring their traffic load and priorities, and how significant are usage-related costs relative to other fixed network costs.

One issue that must be addressed is how price should vary dynamically or responsively to follow changes in a network's state. Such a pricing mechanism may convince users not to transmit when the network is becoming congested. Dynamic state-dependant pricing will, however, appear to users as prices that fluctuate randomly, which is not generally a desirable property. It is pointless in applications where humans rather than computers directly determine when transmissions are made. It is hard to imagine a person watching the tariff for making a long-distance call fluctuate widely on a meter, waiting for the perfect moment to make such a call. However, there are applications where dynamic pricing makes sense. For example, a user wandering the World Wide Web (WWW) might instruct his browser to suspend operation, or to retrieve text not images, or to simply decrease the data rate, when tariffs are high.

Present charging methods such as peak-rate tariffs are incapable of ensuring a proportionally fair allocation of network resources between users in any network where users place different values on their communications.

OBJECTS OF THE INVENTION

The invention seeks to provide a method of allocating shared resources in a telecommunications network which obviates some of the problems associated with known charging methods.

The invention also seeks to provide a method of allocating resources in a telecommunications network in accordance with users' stated willingnesses to pay for said resources.

The invention also seeks to provide a telecommunications network in which users are allocated available resources in accordance with their willingnesses to pay for use of network resources.

SUMMARY OF THE INVENTION

The present invention provides a resource allocation method which is based on the concept of proportional fairness. In this method, users express their willingnesses to pay for network resources. A controller determines how the users' willingnesses to pay are to be divided between the resources in order to determine the relative demands for the resources. Each resource is then divided between those users using it in proportion to how much they are willing to pay for the use of their share of it. The allocation takes into account the relative demands on all the resources in the network. A user may increase his share of the network resources allocated to him by increasing the value of his willingness to pay. The method may be applied either by a central controller (network manager), or it may be delegated to controllers (network element managers/customer premises equipment managers) distributed across the network.

In a dynamic system where the demand for resources is varying rapidly, provided adequate quality of service (e.g. cell loss ratio) can be maintained, then it is better to allow distributed controllers to react to local changes quickly than wait for whole network changes to reach a central controller. In other words, in a centralised control system the resources will not be fully utilised at the times in between when demand change over decisions are made and users' reactions to these are made. In a distributed control system, each controller can use the resources more efficiently locally immediate to demand changes and this leads to a more optimum use of the resources.

The present invention therefore also provides a distributed resource allocation method. The distributed resource allocation method is also based on the concept of proportional fairness. In this method, users express their willingnesses to pay to the local distributed controller which is associated with those users. The bandwidth allocated to each user is determined by the local controller with which they are associated and the allocation takes into account the relative demands on all the resources in the network and the time taken for those demands to reach the distributed local controllers. The distributed controllers each use only locally available information at their respective nodes, but take into account the delays between nodes. The locally available resource (i.e. bandwidth) is divided in proportion to the willingnesses to pay expressed by the various users entering their particular node. On a ring (and in other networks where the only place that traffic streams are multiplexed is at the periphery) this guarantees that no data will be lost (due to cell/packet collision) once it has been launched.

The preferred features of the invention which are more fully defined in the appended claims may be combined as appropriate and as would be apparent to a skilled person.

BRIEF DESCRIPTION OF THE DRAWINGS

In order to show how the invention may be carried into effect, embodiments of the invention are now described below by way of example only and with reference to the accompanying drawings of which:

FIG. 10(*b*) is a graph illustrating simulated results for a four node unidirectional ring in which the WtP value of a selected one of the WtPs is ramped as illustrated in FIG. 10(*a*);

DETAILED DESCRIPTION OF THE INVENTION

Figure 1:
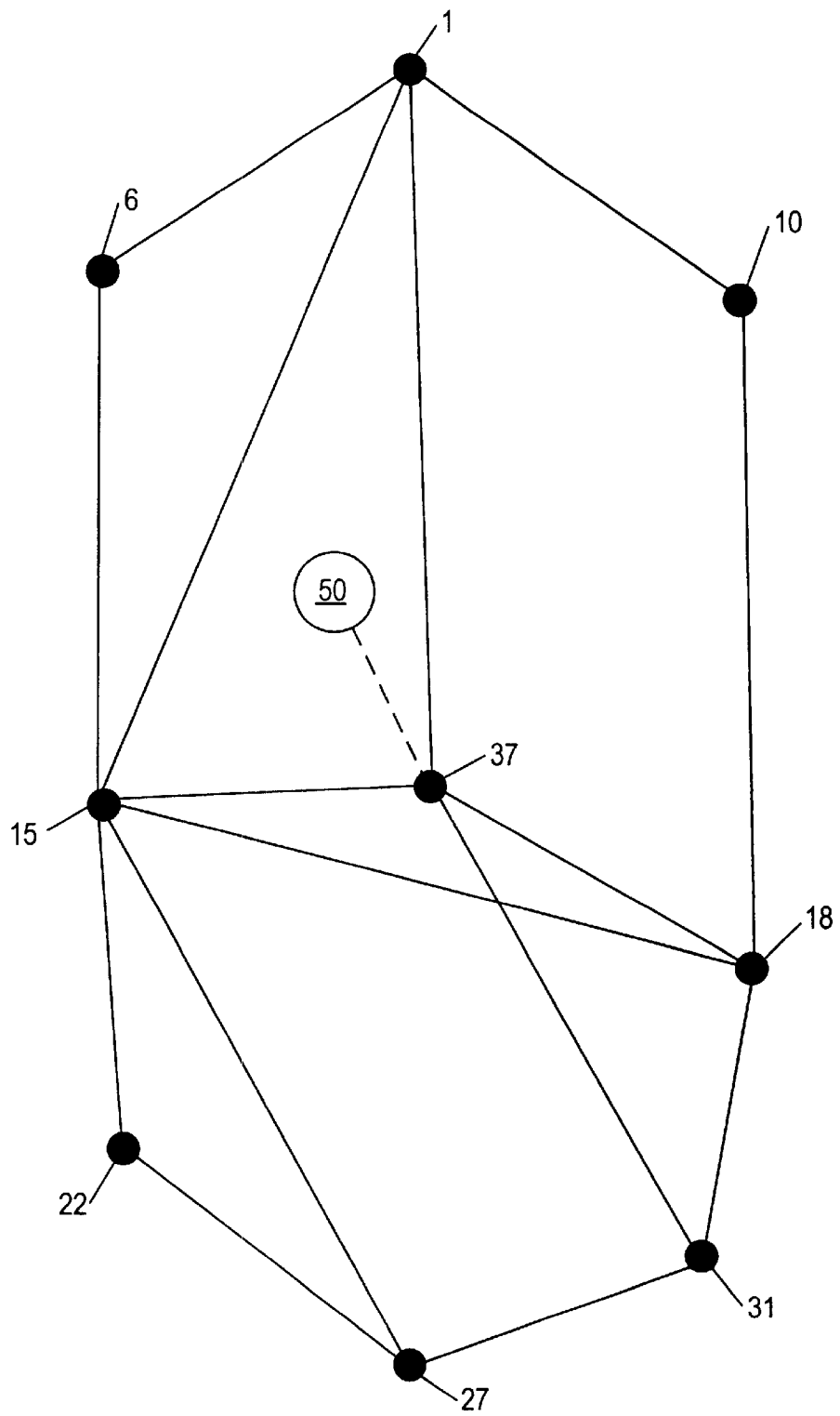
FIG. 1 is a schematic illustration of a telecommunications network utilising the method of the invention.

The first resource allocation method according to the invention is based on the concept of proportional fairness. In this method, users express their willingness to pay (WtP) for network resources, and those resources such as bandwidth are allocated so that each resource is divided between those using it in proportion to how much they pay or are willing to pay for their share of it. Each user expresses only a single WtP value for a particular traffic destination. It is the network manager (central controller) or the local network element manager (distributed controller), not the user's own equipment manager, which determines the route a user's traffic is to take, which calculates how the user's WtP value is to be divided between the resources on the route the user's traffic will take and which calculates each user's allocated bandwidth. A user may increase his share of the network resources on a particular route by increasing his WtP value. An algorithm for implementing the method that assumes a fixed utility function is employed and therefore that users are completely flexible in terms of how much bandwidth they consume.

Fundamental to the principle of proportional fairness is that users of a given resource pay the same per unit of that resource used. This can be thought of as a common price per unit bandwidth. In the case of a set of users sharing a single resource (say a transmission link) r, if an individual's WtP value is given by $m_i$, and the total resource capacity is given by $C_r$ then each user receives:

$$x_i = \frac{m_i c_r}{\sum m_i} \tag{1}$$

and the resource price $p_r$ (equivalent to relative demand $d_r$) per unit bandwidth is given by:

$$p_r = \frac{\sum m_i}{c_r} \tag{2}$$

Notice that before a price can be set it is necessary to know the complete set of WtP data from all potential users.

When signals are transported through an extended network, it is necessary to establish the price per unit bandwidth for the total route. This is done by summing the prices (relative demands) for the separate sections. Capacity is then allocated to the users on the basis of their WtP value divided by the sum of these prices. However, this is where the complexity of the allocation problem arises: the individual section prices are linked to the demand for each section on its own, while the fraction of an individual user's WtP that is allocated to a given section depends upon the prices of all the other sections to be traversed. Thus the price of any one section is influenced, directly or indirectly, by every other user on the network. This rapidly generates a problem of awesome complexity as the network grows in size. It can be demonstrated, however, that a good estimate of the proportionally fair resource allocation can be obtained for a network of useful complexity with a few computational iterations.

A measure of the efficiency of the network utilisation is the utility function defined below. For a single user, it is assumed that a good measure of the benefit received from exploiting bandwidth $\alpha_{mi}'$ at a cost $m_i$ is given by:

$$U_i = m_i \ln x_i \tag{3}$$

Consequently increments of bandwidth produce decreasing benefit, a result which seems to match common experience in a wide range of situations. Notice that the utility function may be applied to a set of users, the aggregate utility being defined in equation 4. The proportionally fair solution occurs when the aggregate utility is maximised.

$$U = \sum_i m_i \ln x_i \tag{4}$$

In an arbitrary network where there will normally be more than one route between a pair of nodes, proportional fairness criteria alone cannot determine the optimum set of routes for real traffic, since the utility function defined in equation 4 may be maximised by several distinct sets of flows resulting from different routing tables. Moreover, the computational complexity of the overall problem escalates rapidly if all possible routes are considered. The algorithm presented below addresses the case where the routes across the network are fixed but of variable capacity (subject to underlying resource constraints).

The algorithm calculates the relative demand, in terms of WtP, for each of the network resources. This makes it possible to determine how each user's WtP value should be divided between the resources used by that user, and hence what his flow (bandwidth) should be. The inputs to the algorithm are the route structure defined for the network and the set of WtPs—one for each source-sink (a user may be associated with more than one source-sink and will express a separate WtP value for each source-sink). The output is the set of proportionally fair flows associated with the given WtPs and routing table.

If we define a network resource by the subscript r, then we can associate with it a capacity $c_r$. We assume that the set S of users i is known and also their associated WtPs, $m_i$. Of these a subset $S_{ir}$ will actually wish to use resource r. The solution to the problem then is to find the fraction $\alpha_{ir}$ of $m_i$ to be applied to each resource r so that the user obtains the same flow $x_i$ through each resource en route. Note that:

$$\sum_r \alpha_{ir} = 1 \tag{5}$$

Each new user applying for capacity along a given route will perturb the unit price for each resource traversed which in turn, through other users, will perturb prices and resource allocation elsewhere.

In the first instance, we make two assumptions:

(i) on network start-up, the WtP value of any given user is split equally between the resources he wishes to exploit; and (ii) if a user is added, or an established user's WtP changes, the prices from the previous resource allocation step are unchanged and the added or changed WtP value is split in proportion to those.

The method iterates from these starting points to establish a better allocation of resources and price (demand) between the competing users by using the WtP fractions to calculate new prices for each resource, reallocate capacities between users and then use these to modify the WtP fractions.

The relative demand for a resource, $d_r$, is given by:

$$d_r = \frac{\sum_{i \in r} \alpha_{ir} m_i}{c_r} \quad (6)$$

where the sum is taken over all the source-sinks using the resource r. The iterative procedure finds the values of $\alpha_{ir}$ that result in equal price per unit bandwidth for all users of any given resource. As the $\alpha_{ir}$ get closer to these values, the $x_i$, as calculated using equation 7, get closer to the proportionally fair flows.

$$x_i = \frac{m_i}{\sum_{r \in i} d_r} \quad (7)$$

Updated values for the $\alpha_{ir}$ are calculated using the estimated relative resource demand $$\alpha_{ir} = \frac{d_r}{\sum_{r \in i} d_r} \quad (8)$$

It can be seen that equations 6 to 8 extend the applicability of proportional fairness from a single resource to a network of many interconnected resources.

The procedure is repeated until the change in the values of the flows ($x_i$) or the values of the WtP fractions ($\alpha_{ir}$) between successive iterations is less than a desired tolerance.

The first resource allocation method according to the invention can be more readily understood from the following description, by way of example only, with reference to FIG. 1. FIG. 1 is a schematic illustration of a telecommunications network comprising a plurality of interconnected nodes (1,6,10,15,18,22,27,31,37) each having at least one user associated therewith. The nodes are connected to neighbouring nodes by transmission links (represented in the figure by straight black lines) which in the following description will each be denoted by their respective source and designation nodes for the sake of clarity. Where a user associated with a node wishes to transmit traffic to different destination nodes, he must provide a separate WtP value for each source-sink and, as such, will be allocated bandwidth for each source-sink as though he were a number of different users equal to the number of his stated WtP values. In the following example, each WtP value stated by a user will also be (subscript) denoted by its respective source and destination nodes for sake of clarity. The network has a network manager 50. The network manager 50 communicates with network element managers (not shown) associated with the nodes.

In this network, the relative demand for a resource $d_r$ is given by $$d_r = \frac{\sum_{i \in r} a_{ir}^{(\prime,\prime\prime)} m_i}{C_r} \quad (9)$$

where $C_r$ is the capacity of resource r and $\alpha_{ir}, \alpha_{ir}', \alpha_{ir}''$ etc are the fractions of the willingness to pay $m_i$ given to the first, second and third (and so on) resources on route i respectively.

In the following description, it has been assumed that the underlying capacities of all the links are the same and equal to unity. If the resource capacities were not all the same, then, when calculating the relative demands for resources with different capacities using equation 9, it would be necessary to know the different capacities of the resources.

Consider the network shown in FIG. 1. Suppose that link (resource) 1-10 carries routes 1-10, 1-10-18, 6-1-10, 15-1-10, 22-15-1-10 and 37-1-10, then the relative demand for resource r=1-10 would be given by:

$$d_{1\text{-}10} = m_{1\text{-}10} + \alpha_{1\text{-}18} m_{1\text{-}18} + \alpha_{6\text{-}10}' m_{6\text{-}10} + \alpha_{15\text{-}10}' m_{15\text{-}10} + \alpha_{22\text{-}10}'' m_{22\text{-}10} + \alpha_{37\text{-}10}' m_{37\text{-}10}$$

where $m_{1\text{-}10}, m_{1\text{-}18}, m_{6\text{-}10}, m_{15\text{-}10}, m_{22\text{-}10}$ and $m_{37\text{-}10}$ are the stated WtP values for the set of source sinks 1-10, 1-18, 6-10, 15-10, 22-10 and 37-10 respectively. If route 22-10 passed through nodes 22-15-1-10, the willingness to pay $m_{22\text{-}10}$ would be divided between the resources (links) 22-15, 15-1 and 1-10 thus:

22-15: $a_{22\text{-}10} m_{22\text{-}10}$ 15-1: $a_{22\text{-}10}' m_{22\text{-}10}$ 1-10: $a_{22\text{-}10}'' m_{22\text{-}10} = \left(1 - a_{22\text{-}10} - a_{22\text{-}10}'\right) m_{22\text{-}10}$ It can be deduced from the above that an iterative method comprising a small number of steps can be established which allows resource allocation in accordance with the first method of the invention to be quickly and relatively easily computed.

The iterative method comprises a first initialisation step thus:

Initialisation step: Select starting values for all $\alpha_{ir}, \alpha_{ir}'$, $\alpha_{ir}''$ etc. For example, for source-sinks (routes) utilising 2 resources (hops), set $\alpha_{ir} = \alpha_{ir}' = \frac{1}{2}$ and for source-sinks utilising 3 resources, set $\alpha_{ir} = \alpha_{ir}' = \alpha_{ir}'' = \frac{1}{3}$.

For each source-sink
  hops (source-sink)=number of links traversed in route (source-sink)
  For i=1 to hops
    alpha(i, source-sink)=1/hops(source-sink)
  Next i
Next source-sink A first iterative step calculates an estimate of resource (link) demands, based on current values for the $\alpha_{ir}, \alpha_{ir}', \alpha_{ir}''$ etc:

For each resource
  demand(resource)=0
  For each source-sink
    If resource in route(source-sink)
      h=which number link resource in route(source-sink) is
      demand(resource)=demand(resource)+alpha(h, source-sink)*m(source-sink)
    End if
  Next source-sink
Next resource In a second iterative step, the estimates of $\alpha_{ir}, \alpha_{ir}', \alpha_{ir}''$ etc are revised:

For each source-sink
  route-demand=0
  For j=1 to hops(source-sink)
    route-demand=route-demand+demand(route-element-j,source-sink)

Next j
For i=1 to hops(source-sink)
    Alpha(i,source-sink)=demand(route-element-i,source-sink)/route-demand
Next i
Next source-sink In a third iterative step, if the values of the $\alpha_{ir}, \alpha_{ir}', \alpha_{ir}''$ etc have changed by more than a desired tolerance, the first and second iterative steps are repeated.

In a final step the proportionally fair flows are calculated. The flows for 1-hop traffic can be calculated directly:

$$x_{1\text{-}hop} = \frac{m_{1\text{-}hop}}{d_{link}}$$

for the appropriate flows, willingnesses to pay and resource demands. The flows for 2-hop (and longer) traffic can be calculated similarly, using the relations:

$$x_{2\text{-}hop} = \frac{m_{2\text{-}hop}}{d_{link_1} + d_{link_2}}$$

for the 2-hop traffic and $$x_{3\text{-}hop} = \frac{m_{3\text{-}hop}}{d_{link_1} + d_{link_2} + d_{link_3}}$$

for the 3-hop traffic, and so on for longer routes.

The relationship between the number of iterations and the degree of convergence is discussed below.

Figure 2:
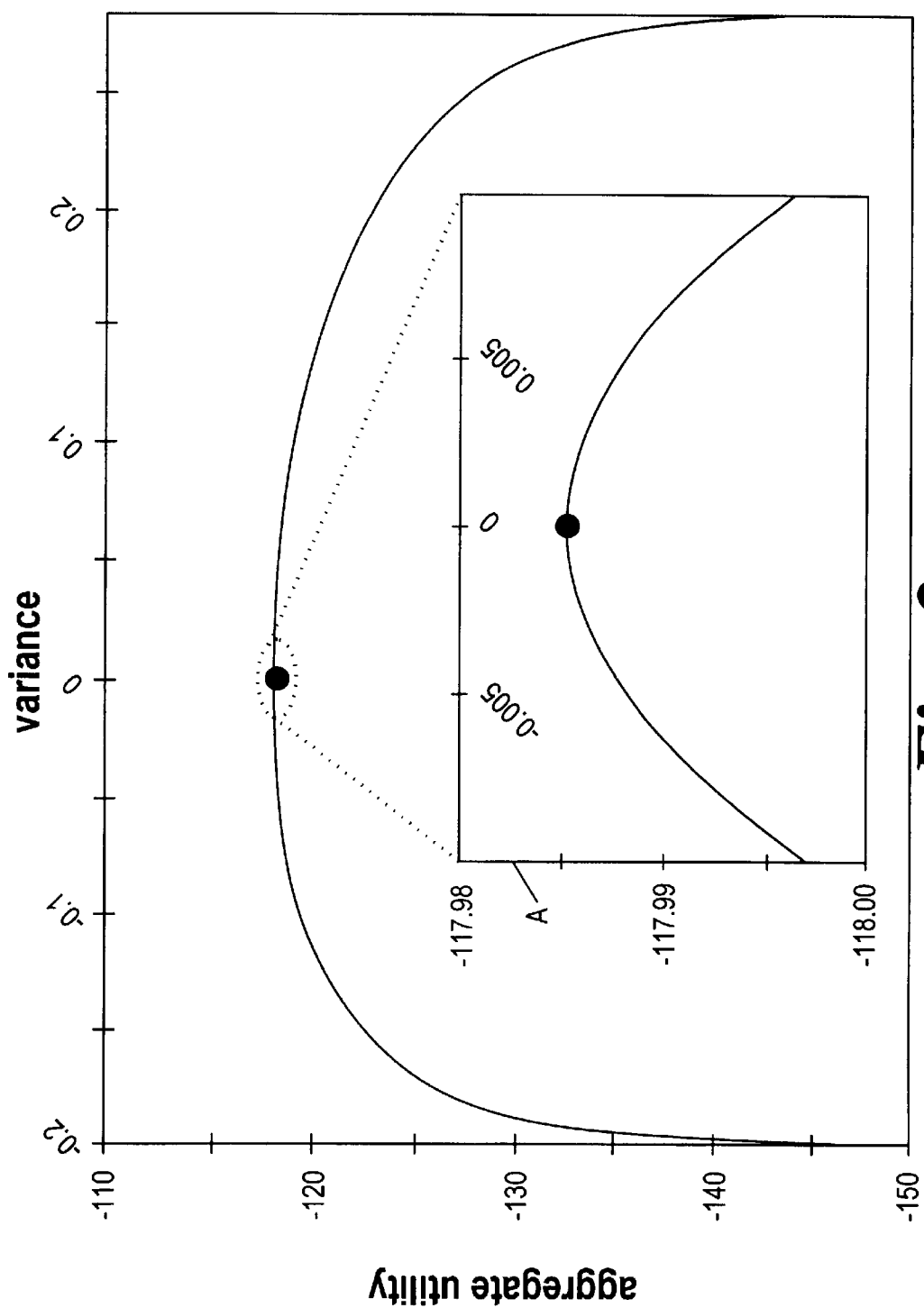
FIG. 2 is a graph illustrating how aggregate utility varies for traffic flow on a network route (source-sink)

FIG. 2 shows how the aggregate utility varies as the flow on a single source-sink is increased or decreased relative to the flow arrived at by the iterative method (variance=0) and competing flows are modified to compensate for the changes in resource utilisation, in order that the capacity constraints should not be violated. It can be seen that the utility curve has a broad flat region around the maximum. This indicates that there are many sets of flows with utility very close to the maximum, but with flows that may be significantly different from those achieved at the proportionally fair distribution. The figure also shows that the iterative method has arrived at the maximum utility solution, as can be seen more clearly in the inset A. It also indicates that if it is desired to achieve a set of flows as close as possible to the proportionally fair set, then optimisation methods based on the value or gradient of the utility function are likely to converge slowly, if at all.

However, as well as being computationally straightforward, the iterative method converges rapidly. In a typical case, the maximum difference in any flow between successive iteration $$\left(\max_{i \in s} |x_i^{(n)} - x_i^{(n-1)}|\right)$$

was found to be less than 0.01 after 7 iterations (n) and improved by an order of magnitude for each further 4 iterations. By comparing the properties of the set of flows to which the algorithm converges with the conditions required for a set of flows to maximise the aggregate utility it has been shown that the resulting flows are proportionally fair.

The absolute level of flow allocated to each source-sink depends on the relative demand for the resources that the flow passes through as given by equation 6. However each user's allocated capacity increases smoothly as his WtP is increased, regardless of the number of resources traversed. This increase is compensated for by a corresponding decrease in the allocation to competing users.

Referring again to FIG. 1, the network manager 50 is connected by the network to each node's network element manager. In an SDH/SONET network, the network manager 50 communicates with each network element manager via an embedded channel. However, to implement the method of the present invention, it is only necessary that the network manager 50 has a means of communicating with each network element manager either directly or indirectly depending on the structure of the network. The WtP values stated by each user are communicated to the network manager 50 which calculates the demands for each resource and allocates bandwidth to each user accordingly. The network manager 50 determines which resources a user will use when sending traffic to a selected destination node. This can be achieved by means of a look-up routing table which predetermines the routes through the network for each node to any other node. Where a user wishes to send traffic to more than one destination, the user states a WtP value for each destination and bandwidth is separately allocated to the user for each destination in accordance with his stated WtP values. It is envisaged that where traffic to a local node relative to a particular user is light i.e. the relative demand (price) is low, the user may be able to reduce his stated WtP value for sending traffic to that destination node and still be allocated the necessary bandwidth to establish the traffic flow. At the same time the user may, for example, choose not to increase his WtP value for long distance traffic utilising a series of connected resources (links) if the network demand for any of those resources is relatively high and thus the cost per unit bandwidth is high. In fact, the user may choose to reduce to zero for a time his WtP value for traffic to a long distance traffic designation node and consequently be allocated no bandwidth for that destination. The user may choose to wait until such time as the unit price has reduced significantly before expressing a WtP value to establish long distance traffic transmission.

To enable a user to determine when, for example, the price for transmitting traffic to a selected long distance destination node has fallen to an acceptable level, the user may be afforded access at any time to the relative demand data calculated by the network manager. An alternative approach to the foregoing is for a user to express a WtP value for a selected destination node and to assess the magnitude of the bandwidth allocated in response thereto. In the case where the bandwidth is less than desired, the user can determine how much more it is necessary to increase his WtP value for that destination and should the determined WtP value exceed a predetermined limit set by the user, he may then choose to reduce the WtP value to zero to end transmission. In the case where the allocated bandwidth is greater than required, the user can reduce his WtP value to a lower level just necessary to assure the desired bandwidth allocation. By any combination of the above, a user can control his expenditure on traffic transmission by manipulating his WtP values over time. It will be appreciated that a user will not manually manipulate his WtP values but will embed his priorities and strategies for manipulating said WtP values in software operating on his equipment's manager. The user's decision on when to transmit long distance traffic may also be influenced by the type of traffic he wishes to transmit to the long distance destination node. For example, if the traffic consists of a non-urgent data transfer, then transmission of this may be delayed until a "low price" period. This strategy would also be embedded in the user's software. In this way, the allocation method brings market forces to bear on the utilisation of network resources. A benefit of this is that it increases operator revenues by ensuring that resources are allocated to those users prepared at any point of time to pay for them. It also encourages more responsible user behaviour by means of the pricing mechanism.

It is recognised that where the network includes a number of users always prepared to pay premium rates for network resources, an inflationary spiral in WtP values may occur in order to secure resources. Consequently, it is envisaged that the network manager 50 can set a cap on WtP values for selected users according to some criteria relating to the type of user. This may even be customer loyalty based, where the WtP cap for users deemed loyal to the operator is set at a higher level than for those deemed less loyal. This provides the advantage of generally not reducing operator revenues but allows a "loyal" user to outbid other users to gain the resources required for transmitting his traffic.

In the system of FIG. 1, the network may comprise a relatively small number of large entity (corporate) users operating equipment such as private branch exchanges (PBXs) "negotiating" for resources for periods of time in excess of seconds. In such a case, centralised control by the network manager 50 is desirable since the manager has time to poll each of the users for updated WtP values for different traffic destinations and to then allocate bandwidth accordingly. However, where the number of users increases, it becomes necessary to more rapidly take account of changes in users' changed preferences and centralised control becomes less efficient. A distributed resource allocation method according to the invention which is more dynamic in operation than that afore described is discussed later.

Alternatively, in the network of FIG. 1, the at least one user associated with each node (network connection point) might be an individual subscriber and the network may be of a local area network (LAN) size. However, in the present invention it is envisaged that the network will be a wide area network (WAN) having, corporate entities' LANs, for example, as users. This is better illustrated by FIG. 3.

Figure 3:
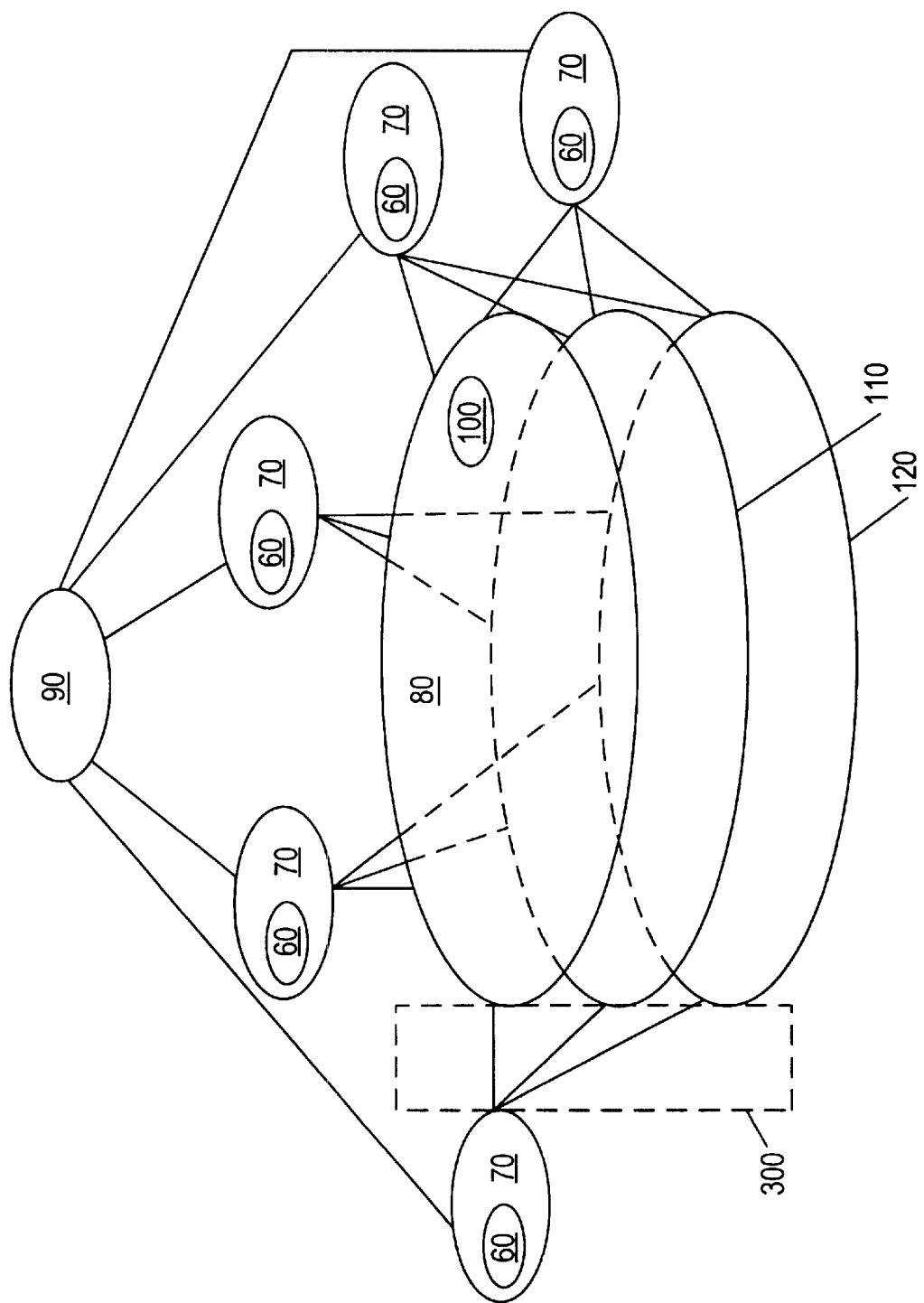
FIG. 3 is a schematic illustration of an arrangement of conventional CPEs in a WAN network utilising the method of the invention.

FIG. 3 schematically illustrates a conventional arrangement of local customer premises equipment (CPE) managers 60 who control connection of corporate entity site networks (LANs) 70 to each other across a WAN 80. The overall negotiation of traffic contracts with a WAN provider is coordinated by a corporate network manager 90 based on high level corporate policies. The corporate network manager 90 negotiates at a high level with the WAN network manager 100. The WAN network manager 100 is responsible for managing the connection of many other corporate entity networks (not shown) across the WAN 80. The high level corporate policies are aimed at optimising the cost benefit trade-off of the WAN network resources purchased. The WAN network provider aims to maximise revenues from his resources whilst maintaining the quality of service guaranteed to his customers. In a competitive deregulated environment as envisaged with the CPE managers (60) able to choose alternative WAN carriers (110,120), this also means being more responsive to the changing needs of the many corporate entity customers. As multimedia data traffic comes to dominate over the relatively easily predicted voice traffic, the self similar and non-deterministic nature of the traffic, even when aggregated into large inter-site 'trunk' routes means that traffic flows will have bursts, surges and trends that operate on all time-scales from days down to milliseconds. The unpredictable timing of these surges makes traditional time multiplexing of the traffic impossible, for the delay sensitive components.

In such a network, the CPE manager (60) operates software which embodies the corporate entity's priorities on traffic transmission across the WAN 80. Such software can be automatically updated via the network to reflect changes in corporate policy. In operation, the CPE manager 60 expresses for each desired traffic destination a single WtP value which is the aggregate of the WtPs for all users wishing to send traffic to that destination managed by the CPE manager (60). The corporate policy may dictate preferences for different corporate employees' traffic and consequently set different WtP values for those employees' communications across the WAN. Bandwidth allocated to the CPE 70 is based on the CPE's stated WtP value but each user managed by the CPE manager 60 is allocated a share of said bandwidth by the CPE manager 60 in proportion to the WtP values set by corporate policy. In this way, the complexity of the network resource allocation is removed from the WAN network manager 110 and distributed to the corporate CPE managers (60) assisted, as necessary, by the corporate network manager 90 and the network manager 110.

Existence of congestion of network resources rapidly shows up as rising price (demand) per unit bandwidth. Monitoring prices gives a simple measure of network congestion and can be used by the corporate network manager 90 as a means of negotiating extra capacity from the WAN provider.

Equally, where a network is an internet for example, an entity connected to the network may comprise a service provider (SP) acting on behalf of a multitude of separate individuals and other users. As with the distributed CPE manager allocation method, the SP states a single WtP value on behalf of its users, this also being the aggregate of the users' WtPs. Once again, bandwidth allocated to the SP is shared amongst its users in proportion to their WtPs. Each user is provided with software to run on his equipment to enable him to connect to the network and express a WtP value for a communication to a destination. The software will be arranged to allow the user to customise his preferences in setting a single WtP for any destination. For example, it is important that delay sensitive traffic such as voice is given some priority on the network. This is achieved by the user specifying a relatively high WtP value for voice traffic but even with this the user is not guaranteed access to network resources at all times, given that other users may be congesting the network with even higher value, from their perspective, communications, i.e. they are paying more for access at that point in time.

Users such as internet users connected to a SP may express their WtP by means of a monthly subscription to an account held with the SP. Consequently, a banking function is built into the system to reward infrequent users who, in effect, save their subscription for infrequent network resource utilisation. Such users WtP values may be made proportional to unused subscriptions held on account by their SP.

From the above, it will be appreciated that even where the demands on network resources are not changing rapidly, it may still be more efficient to organise network resource allocation through distributed controllers such as customer premises equipment managers or SP managers. In addition, whilst the foregoing has concentrated on describing the allocation of resources with respect to transmission links, it will be understood that other network resources could equally be allocated by the same method and simultaneously with transmission resource allocation. Other resources suitable for allocation in accordance with the method include, by way of example only, data retrieval from databases, video conferencing, multimedia services, etc.

In some networks, it will be decided to not allocate every network resource in strict accordance with the afore described method. It may be preferred to allocate only specified resources using the method. Such resources will be identified by the network controller as allocatable resources and the controller will maintain an updateable register of such resources. Allocatable resources may be those of relatively low capacity when compared to other network resources and which are most likely to become congested causing bottlenecks, for example, in the network.

A second resource allocation method according to the invention determines limits to speed with which proportionally fair resource allocation can be applied. The following description is based on the application of the second method according to the invention to a four-node unidirectional ring for ease of understanding. However, it will be appreciated that the method can readily be adapted for any network configuration where traffic flows are multiplexed at the periphery. The controllers for the four nodes in the unidirectional ring make decisions locally based on the available global knowledge about the relative demands for the various network resources. Each local (distributed) controller calculates its relative demands from the WtPs expressed for a resource associated with its node and continuously passes that information to the other controllers. Each node inserts traffic (ingress flow) into the network for the available capacity (total associated resource capacity minus the throughput traffic) at that node. If the traffic intended to get into the network is higher than the capacity available, then the remaining traffic which can not get into the network will be buffered at the input nodes, not buffered inside the network (input queuing). It is assumed that the traffic exiting at a node can always be handled by the receiving device (router or desktop). Therefore, no packets need to be queued within the network and also packets will not be lost once it is on the network.

The ingress flow is divided between the users entering that node, according to their WtPs and the relative demands on other parts of the network. The controller at each node uses the available information about the demands, in order to calculate the proportional division of the price paid to (demand for) each resource. The proportional price paid to each resource is also passed to other controllers so that each controller can update its latest demands. The throughput traffic through a node determines how much traffic can be inserted onto the network at any instant of time. The above process is done at every instant of time and this leads to the proportionally fair traffic distribution of the network once the traffic has settled down.

For the sake of simplicity, it is assumed that each user is uniquely associated with a single source-sink (route). If a source-sink is used by more than one user, the appropriate bandwidth allocation can be found by aggregating the WtP values of each of those users, to determine the total bandwidth that they should collectively receive, and then dividing that bandwidth among said users in proportion to their offered WtP. The WtP value expressed by each user is, as before, a single value. In the case where a user is associated with more than one source-sink then, as before, the user must express a separate WtP value for each source-sink that he is associated with.

If we define a resource in the network by the subscript r, then the capacity of the resource is $C_r$. The subscript h defines the number of hops (links or resources) each flow has to pass through from the starting node i. Therefore, the users' individual WtP values are given by $m_{ih}$ and their associated flows are $x_{ih}$.

Each controller needs to know the relative demands on the network resources. A node at instant of time t will receive past relative demand information from the other nodes depending on how far the other nodes are from the receiving node. For example, node i=4 will receive the following relative demand information in a four node ring, $D_{i-1}(t-1)$, $D_{i-2}(t-2), D_{i-3}(t-3)$ and the node knows its own latest demand $D_i(t-1)$ for the resource (transmission link) upstream of it. This makes it possible to determine how each user's WtP value should be divided between the resources used by each user. The fractions which determine how much of a user's WtP value should be paid to each resource by a user are given by:

$$a_{ih} = \frac{D_r(t-1)}{\sum_{h=\text{resources\_en\_route}} D_{r-h}(t-\tau)}$$

where $\tau$ is the time lag depending on how far other resources are from the node in question. Once this has been done, each controller knows how much each ingress user at that node is paying for the resource associated with that node. In other words, the total amount paid by the ingress flow to the resource associated with the ingress node IP, is known. Therefore, the controller divides the available capacity between the users entering that node, according to how much each user is paying to that resource.

The ingress flows are given by:

$$x_{ih} = (C_r - X_r)\frac{a_{ih} \times m_{ih}}{IP_r}$$

where $X_r$ is the throughput traffic at node i. Each node receives information about what fraction of price is paid to that node (i.e. to the resource associated with that node) by the passing through traffic (throughput traffic), which is $TP_r$. The total amount paid to a resource is the sum of the prices paid by the ingress flows and the throughput flows, hence the relative demand $D_r$ at that resource can be calculated as:

$$D_r = \frac{IP_r + TP_r}{C_r}$$

Each node sends its relative demand information to the other nodes and the other nodes receive these data after certain time clicks (periods) depending on how far the receiving nodes are from the sending nodes. The above steps are followed at every instant of time and the algorithm converges to the proportionally fair distribution in the steady state.

Initially the algorithm assumes equal relative demands (or these can be taken as random demands) at the network resources. The initial available capacity would be the total capacity of the resource, but once the network has started the available capacity will be continuously changing according to the volume of throughput traffic at each node. The network allocates the sum of the ingress flows at each node to be equal to the available capacity of the resource associated with the node, hence the resources are always fully utilised.

Controlling the flow of traffic in such a way as to maximise utility, minimise cell loss and treat different users in a recognisably "fair" manner is a difficult problem in IP networks. The method as above-described takes into account the above issues and leads to the proportionally fair flow allocation without loss in the core of the network. This confirms that proportionally fair traffic allocation is suitable for multi organisational domain operation because of the simple and easily understood analogy between the total "price" paid by the network node and the proportional use of overall network resources.

In the method, the fairness control is done at the inputs, hence the fairness control is a manageable fairness method which could be changed to another fairness method (simply by altering users WtP algorithms at the inputs without altering the core switch controllers at all). This method always relies on the available capacity on the ring (the capacity available at various resources can be different due to pre-reserved traffic on the resources), hence this can be used for data transfer on top of an existing traditional circuit switched network. Since, this method works on the past information from other parts of the networks, the allocated flows may not be perfectly proportionally fair in the short term (1 or 2 circuit times e.g. a few mS for a 500 Km ring), but the ring will rapidly converge on the exact proportionally fair solution for stable input demands.

Figure 4:
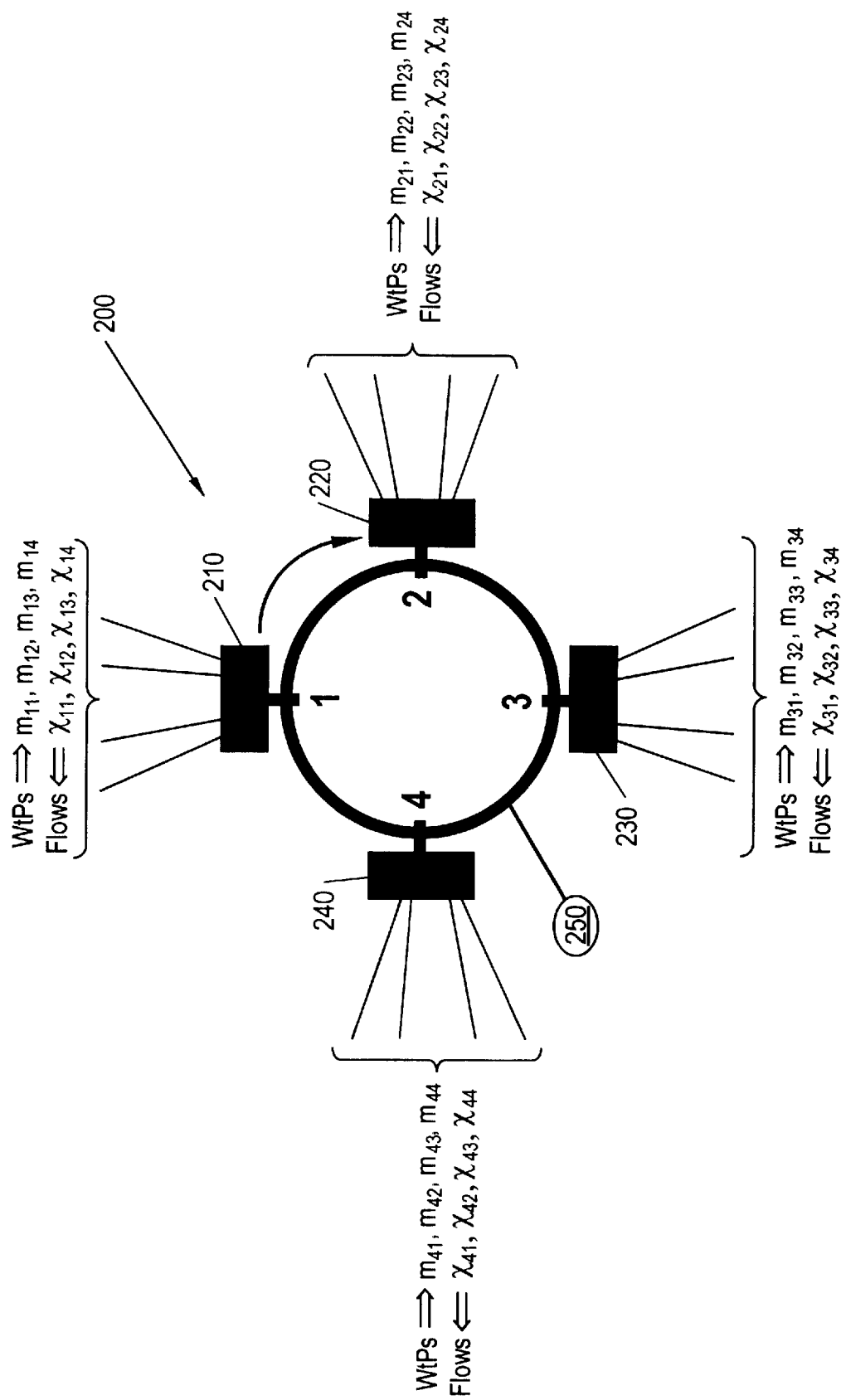
FIG. 4 is a schematic illustration of a four node unidirectional ring telecommunications network utilising the method of the invention.

The second resource allocation method according to the invention can be more readily understood from the following description, by way of example only, with reference to FIG. 4.

FIG. 4 schematically illustrates a four node unidirectional ring 200 comprising nodes 1, 2, 3, 4 distributed around the ring in the direction of traffic flow. Each node (1, 2, 3, 4) has a respective controller (network element manager) 210, 220, 230, 240. Each node is responsible for, ie has associated therewith, a resource which comprises the transmission link upstream of it. For sake of clarity, each of such resources will be denoted by the same reference numeral as its associated node. In ring 200, there are 16 source-sinks (each node can send information to all 4 nodes including itself). Assuming each user is uniquely associated with a single source-sink, there will be 16 WtPs and 16 allocated traffic flows in the system. A network manager 250 communicates with each of the network element manager (210, 220, 230, 240).

Willingness to pay at an instant of time t is $m_{ih}(t)$, where i is the source node number and h is the number of hops (links) in the route. Similarly, allocated flows are $X_{ih}(t)$. Demands at resources are $DD_r(t)$, where r is the resource number. Demand has the same units as willingness to pay.

Capacity of the resources are $C_r(t)$ in units of bandwidth, where r is the resource number.

Relative demand at resources are $$D_r(t) = \frac{DD_r(t)}{C_r(t)}$$

and this indicates how busy the resources are with respect to the capacity of those resources. The relative demands are in units of currency per bandwidth, i.e., it is equivalent to price per unit bandwidth at a resource.

The WtP expressed by each user $m_{ih}(t)$ is a single value, even when the route taken by their traffic passes through more than one network resource. The local controller at each node (1, 2, 3, 4) needs to calculate how a user's WtP value should be divided between the network resources (1, 2, 3, 4) en route. The local controllers divide the users' WtP values according to the relative demands of the resources en route. The relative demand information will have reached the controllers only after a certain number of time clicks depending on how far the other nodes (1, 2, 3, 4) are from the local node concerned. Therefore, each controller uses the available relative demand information (past information) in order to calculate the portions of prices paid to resources (1, 2, 3, 4) en route. Initially at the start of the network, the relative demands between the resources are unknown, hence it is assumed that the network starts with random (could be equal) relative demands (prices) between resources. Once the network is started, each node updates its latest relative demand and this information is passed to the other nodes in the network.

At a particular node, there is through traffic (traffic passing through a node without exiting at the node) as well as ingress traffic (traffic joining at the node from outside the ring). In order to calculate the demand at a resource, the total price paid to that resource by all the flows which are using that resource is required. There will be two proportional price paid parameters to a resource, one from the proportional price paid by the ingress flow ($P_{i,r}(t)$), where i is the node number and r is the resource number, the other from the proportional price paid by the through traffic ($PP_{i-1,k}(t-1)$). The demand at a resource is the sum of the above two proportional prices paid to that resource. This relative demand information is passed around the network at all times.

Information about the proportion of price paid by the through traffic to each node is carried along the network. Each node receives information from it's neighbouring node about the proportional price paid to the other resources. For example node i will receive the following from node (i-1), $PP_{i-1,k}(t-1)$, where k=i,i+1,i+2. In other words, $PP_{i-1,k}(t-1)$ will indicate to node i that the through traffic has paid $PP_{i-1,i}(t-1)$ to node i, $PP_{i-1,i+1}(t-1)$ to node (i+1) and $PP_{i-1,i+2}(t-1)$ to node (i+2). This information is sufficient for each node to calculate the latest demand at the nodes (i.e. in order to calculate the demands, a node does not need to know the individual prices paid by the through traffic, a node only needs the sum of price paid by the through traffic). Each node uses $PP_{i-1,k}(t-1)$ to update its latest relative demand and sends the updated $PP_{i-1,k}(t-1)$ to the next node.

The method can more easily be explained by giving the steps involved at a particular node. Considering node 1 by way of example:

Signals Received from Node 4

| | |
|---|---|
| Relative Demands information: | $D_4(t-1), D_3(t-2), D_2(t-3)$ |
| Proportional Price Paid by the through traffic: | $PP_{4,2}(t-1), PP_{4,2}(t-1), PP_{4,3}(t-1)$ |
| Total through flow at node 1: | $X_{through}(1,t)$ |
| Ingress Signals (Willingness to Pay): | $m_{11}, m_{12}, m_{13}, m_{14}$ |
| Each node keeps it's own old demand information: | $D_1(t-1)$ |

Algorithm at Node 1

Proportion paid by the Ingress Flow:

$$P_{1,1}(t) = m_{11}(t) + \alpha_{11} m_{12}(t) + \beta_{11} m_{13}(t) + \gamma_{11} m_{14}(t)$$

where $\alpha_{ih}, \beta_{ih}, \gamma_{ih}$ are the factors which determines what proportion should be paid to each resource by a source-sink. The relative demands $D_1(t-1), D_2(t-3), D_3(t-2), D_4(t-1)$ are used for the calculation of $\alpha_{ih}, \beta_{ih}, \gamma_{ih}$. Consider the following as an example, factors determining the proportions paid to resource 1 are:

$$\alpha_{11} = \frac{D_1(t-1)}{D_1(t-1) + D_2(t-3)}$$

$$\beta_{11} = \frac{D_1(t-1)}{D_1(t-1) + D_2(t-3) + D_3(t-2)}$$

$$\gamma_{11} = \frac{D_1(t-1)}{D_1(t-1) + D_2(t-3) + D_3(t-2) + D_4(t-1)}$$

Having calculated the proportion paid to resource 1, the updated relative demand at node 1 is (proportion paid by ingress flow+price paid by the through traffic):

$$D_1(t) = \frac{P_{1,1}(t) + PP_{4,1}(t-1)}{C_1(t)}$$

Now by using this updated relative demand instead of the old demand, the values are re-calculated, i.e., factors are now as: $\alpha_{ih}, \beta_{ih}, \gamma_{ih}$ from the demands $D_1(t), D_2(t-3), D_3(t-2), D_4(t-1)$.

Updated Proportion Paid by Ingress Flow:

$$P_{1,1}(t) = m_{11}(t) + \alpha_{11} m_{12}(t) + \beta_{11} m_{13}(t) + \gamma_{11} m_{14}(t)$$

Similarly proportions paid to other resources by node 1 ($P_{1,2}(t), P_{1,3}(t), P_{1,4}(t)$) are also calculated.

Therefore, the final Relative Demand at node 1 is:

$$D_1(t) = \frac{P_{1,1}(t) + PP_{4,1}(t-1)}{C_1(t)}$$

Therefore, proportional price paid information sent to node 2 from node 1 are as follows:

$$PP_{1,2}(t) = P_{1,2}(t) + PP_{1,2}(t-1)$$

$$PP_{1,3}(t) = P_{1,3}(t) + PP_{1,3}(t-1)$$

$$PP_{1,4}(t) = P_{1,4}(t)$$

As shown below, at an instant of time, there will be 24 unknown factors (4×(one α, two βs and three γs)). However, all of these can be written in terms of the four relative demands.

|  | 1st Resource | 2nd Resource | 3rd Resource | 4th Resource |
|---|---|---|---|---|
| Node 1 | $\alpha_{11}$ | $\alpha_{12} = (1 - \alpha_{11})$ | | |
|  | $\beta_{11}$ | $\beta_{12}$ | $\beta_{13} = 1 - (\beta_{11} + \beta_{12})$ | |
|  | $\gamma_{11}$ | $\gamma_{12}$ | $\gamma_{13}$ | $\gamma_{14} = 1 - (\gamma_{11} + \gamma_{12} + \gamma_{13})$ |
| Node 2 | $\alpha_{21}$ | $\alpha_{22} = (1 - \alpha_{21})$ | | |
|  | $\beta_{21}$ | $\beta_{22}$ | $\beta_{23} = 1 - (\beta_{21} + \beta_{22})$ | |
|  | $\gamma_{21}$ | $\gamma_{22}$ | $\gamma_{23}$ | $\gamma_{24} = 1 - (\gamma_{21} + \gamma_{22} + \gamma_{23})$ |
| Node 3 | $\alpha_{31}$ | $\alpha_{32} = (1 - \alpha_{31})$ | | |
|  | $\beta_{31}$ | $\beta_{32}$ | $\beta_{33} = 1 - (\beta_{31} + \beta_{32})$ | |
|  | $\gamma_{31}$ | $\gamma_{32}$ | $\gamma_{33}$ | $\gamma_{34} = 1 - (\gamma_{31} + \gamma_{32} + \gamma_{33})$ |
| Node 4 | $\alpha_{41}$ | $\alpha_{42} = (1 - \alpha_{41})$ | | |
|  | $\beta_{41}$ | $\beta_{42}$ | $\beta_{43} = 1 - (\beta_{41} + \beta_{42})$ | |
|  | $\gamma_{41}$ | $\gamma_{42}$ | $\gamma_{43}$ | $\gamma_{44} = 1 - (\gamma_{41} + \gamma_{42} + \gamma_{43})$ |

Allocation of Ingress flow

Available capacity at node 1 is: $Cav_1(t) = (C_1 - X_{through}(1, t))$ $$x_{11}(t) = \frac{m_{11}(t)}{P_{11}(t)} Cav_1(t)$$

$$x_{12}(t) = \frac{\alpha_{11}(t) \times m_{12}(t)}{P_{11}(t)} Cav_1(t)$$

Allocated flows at node 1 are:

$$x_{13}(t) = \frac{\beta_{11}(t) \times m_{13}(t)}{P_{11}(t)} Cav_1(t)$$

$$x_{14}(t) = \frac{\gamma_{11}(t) \times m_{14}(t)}{P_{11}(t)} Cav_1(t)$$

where $x_{11}(t)$ is the flow from node 1 to node 2 (1 hop flow)

$x_{12}(t)$ is the flow from node 1 to node 3 (2 hops flow)

$x_{13}(t)$ is the flow from node 1 to node 4 (3 hops flow)

$x_{14}(t)$ is the flow from node 1 to node 1 (4 hops flow)

The above steps are done at each node at every instant of time, hence this dynamically allocates the available bandwidth at each node to the ingress flows at that node. Since this dynamic allocation is done continuously and the information is passed on to the other parts of the network continuously, the algorithm converges to the proportionally fair distribution in the steady state.

FIGS. 5 to 12 show simulated results for different scenarios in the four node unidirectional ring 200. In each case the WtP values are listed in accordance with the following notation: WtP=[$m_{11} m_{12} m_{13} m_{14}$, $m_{21} m_{22} m_{23} m_{24}$, $m_{31} m_{32} m_{33} m_{34}$, $m_{41} m_{42} m_{43} m_{44}$]. For the sake of clarity only simulated traffic flows $x_{12}$, $x_{21}$, $x_{33}$, and $x_{44}$ of the sixteen simulated traffic flows in the ring 200 are illustrated in FIGS. 5 to 12. From these illustrated traffic flows ($x_{12}$, $x_{21}$, $x_{33}$, $x_{44}$) the not shown flows can be deduced.

Figure 5:
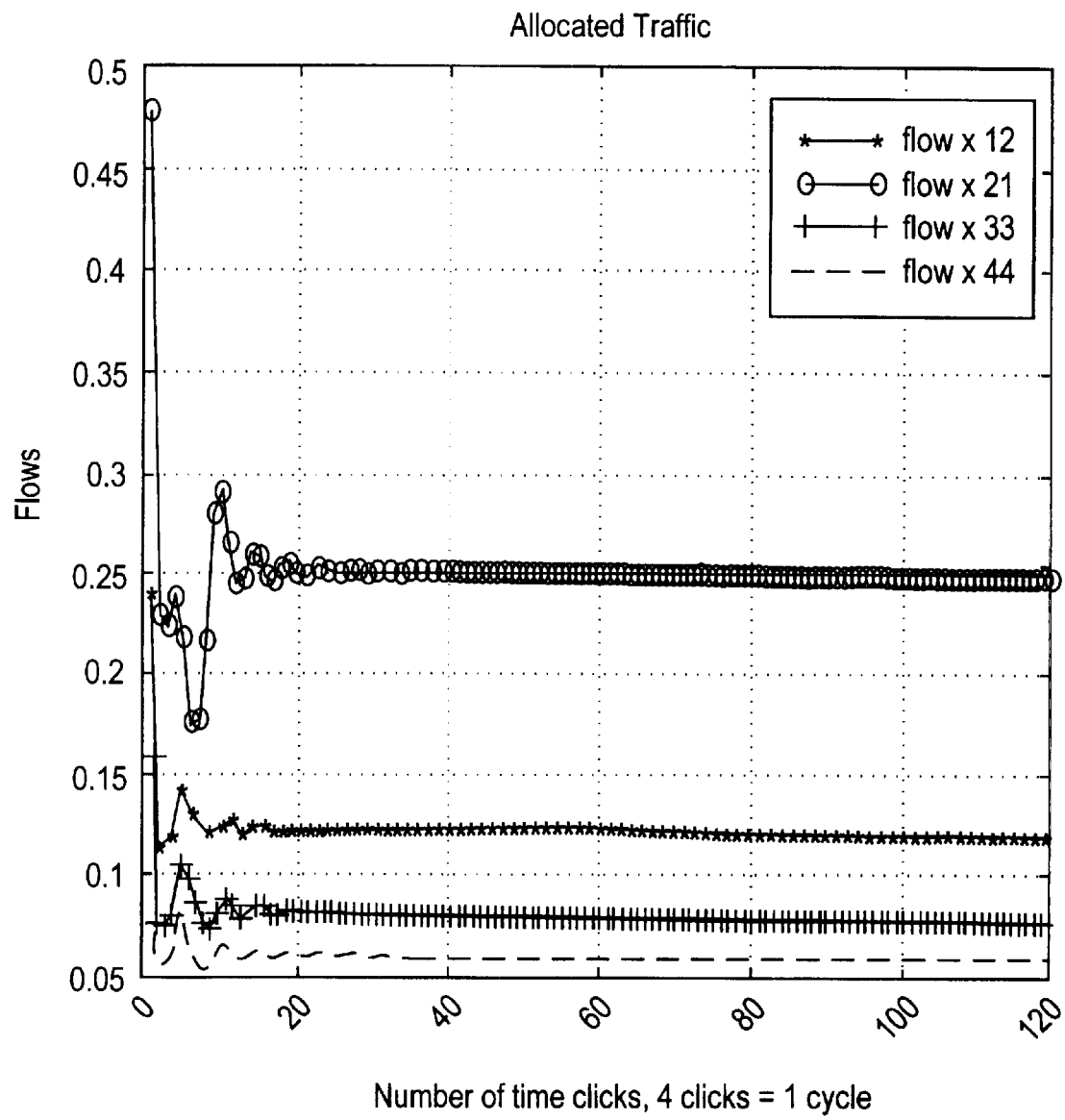
FIG. 5 is a graph illustrating simulated results for a four node unidirectional ring in which the WtP values are equal to unity.

FIG. 5 illustrates a case where the WtPs=unity. Here, all the source-sinks have equal willingness to pay values and the flows are allocated in a proportionally fair manner. In other words, 1-hop flows are given ¼ of the bandwidth (BW), 2-hops flows are given ⅛ of the BW and 4-hops flows are given 1/16 of the BW. This shows that the network has stabilised within 20 clicks (=5 round trips) even from a cold start with zero initial willingness to pay.

Figure 6:
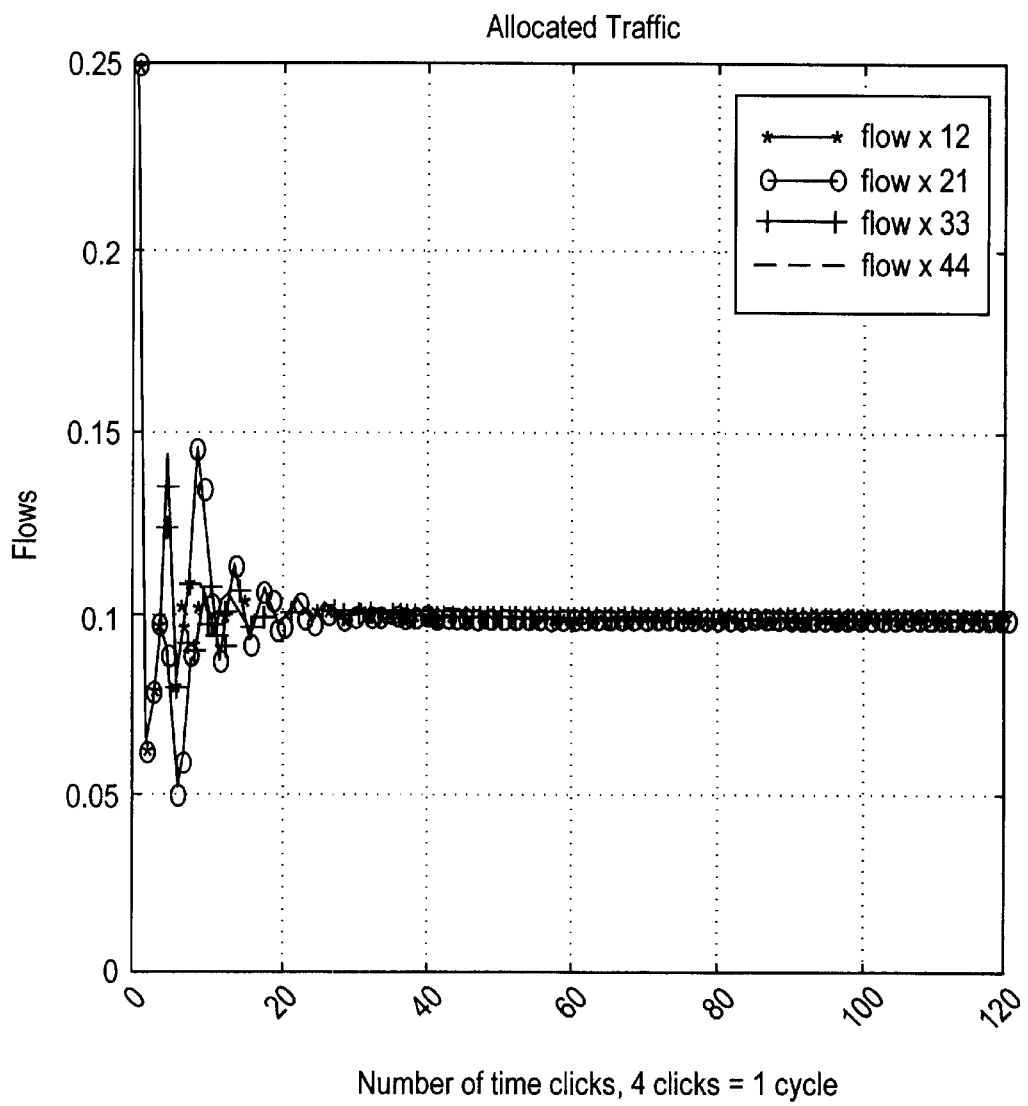
FIG. 6 is a graph illustrating simulated results for a four node unidirectional ring in which the WtP values are hop symmetric.

FIG. 6 illustrates the situation where the willingness to pay is hop symmetric. In other words, the amount paid or bid is in the ratio of how many hops the particular source-sinks are taking. Therefore, in equilibrium the flows are equal for all the source-sinks.

Figure 7:
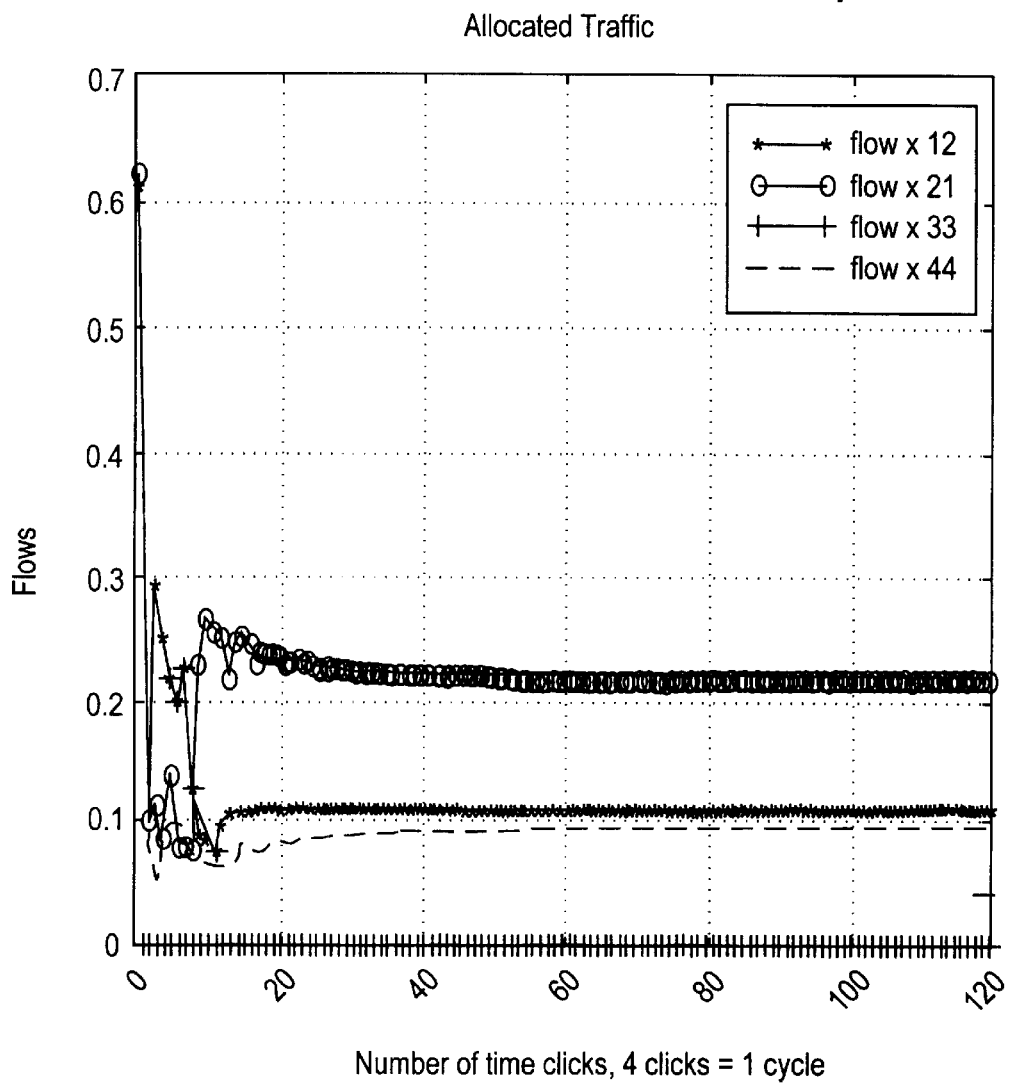
FIG. 7 is a graph illustrating simulated results for a four node unidirectional ring in which the WtP values are set at random values.

FIG. 7 illustrates random WtP values. This shows that the network takes a little longer to settle with asymmetric willingness (hence demand) turned on at zero time.

Figure 8:
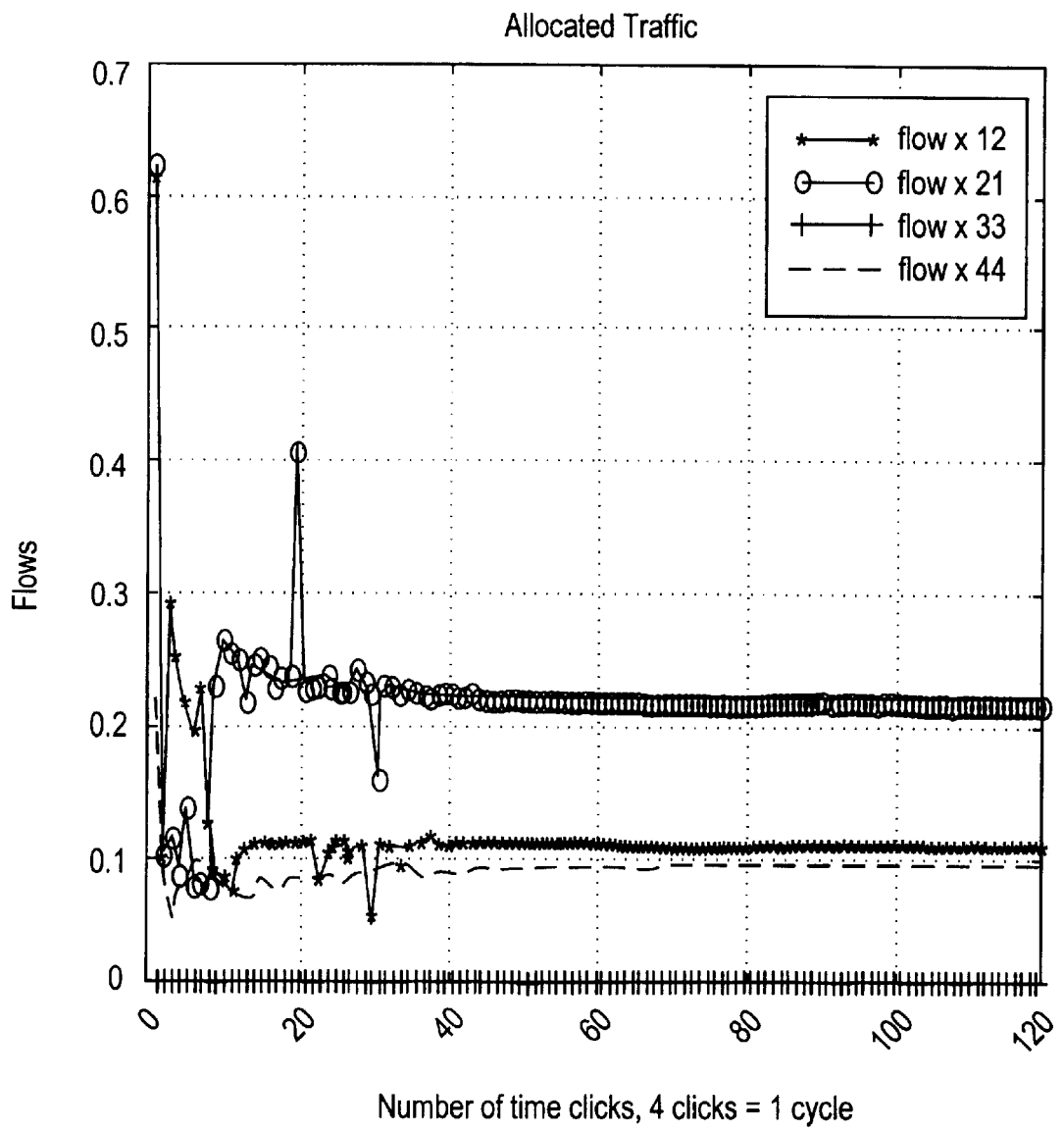
FIG. 8 is a graph illustrating simulated results for a four node unidirectional ring in which the WtP values for selected ones of the WtPs are changed for one time period only.

In FIG. 8, the WtPs are as for FIG. 7 but selected ones of the WtPs are changed for one time period only at clicks 20 and 30, and the affect on the flows are shown. At time click=20 $m_{21}$ is changed to 15 and at time click=30, $m_{13}$ is changed to 8.

Figure 9:
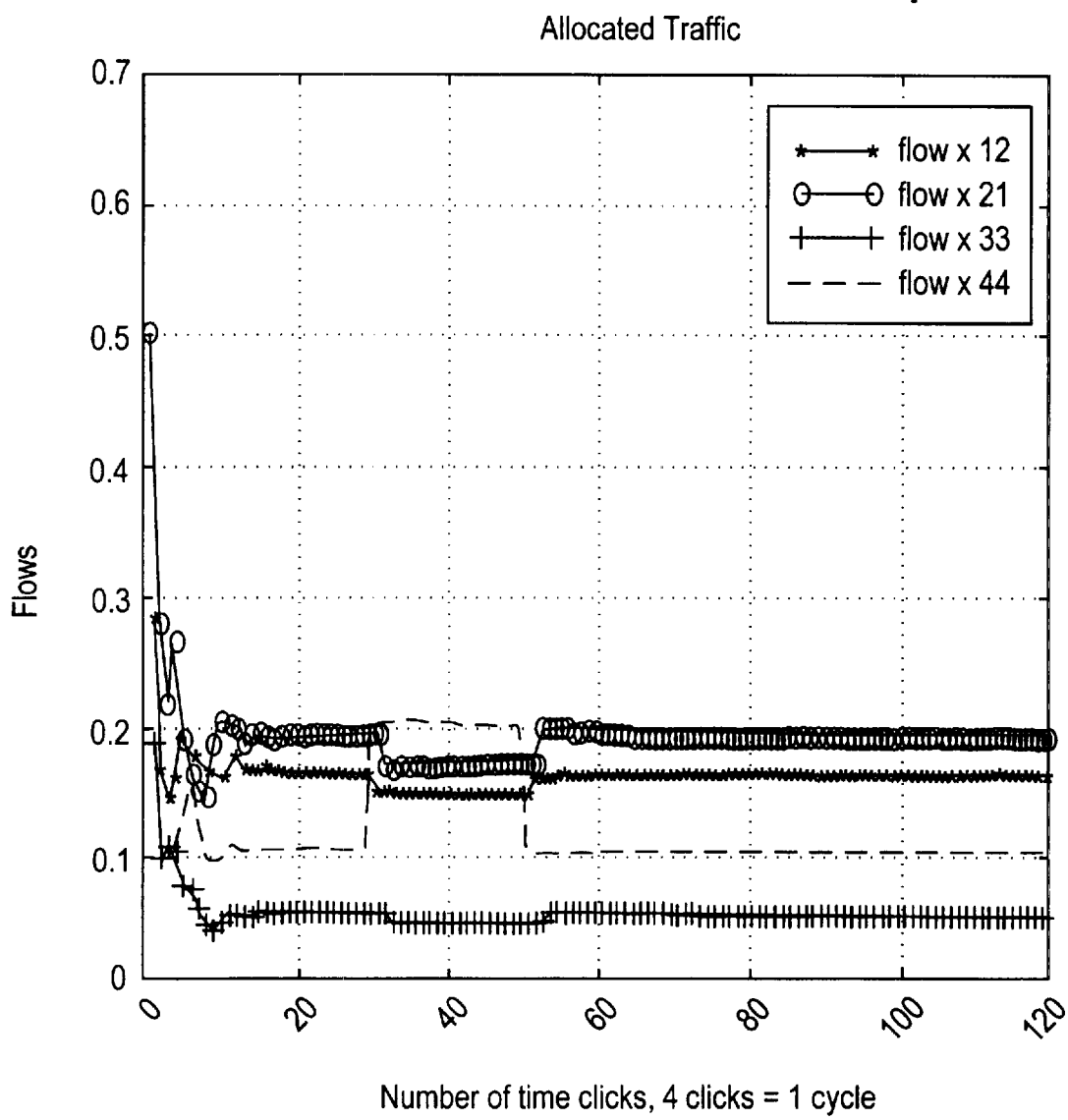
FIG. 9 is a graph illustrating simulated results for a four node unidirectional ring in which the WtP values for a selected one of the WtPs is changed for a relatively prolonged period of time.

In FIG. 9, the WtP value $m_{44}$ is increased to 20 units from a value of 7.33 at time click 30 remains at this value until time click 50. The results show that the above change has affected all the flows since it is a 4-hops flow which couples with all the other flows.

Figure 10A:
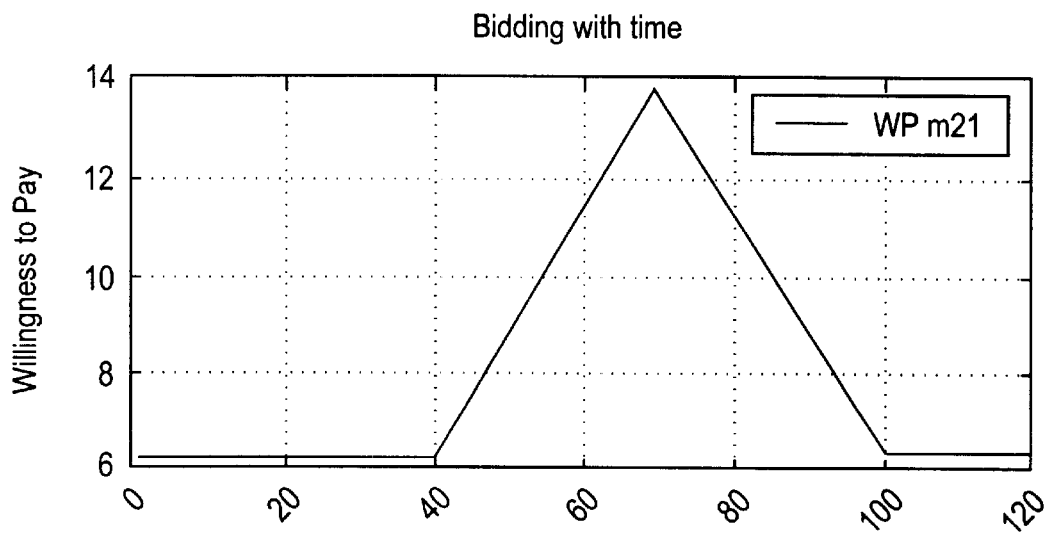
FIG. 10(*a*) is a graph illustrating a ramped WtP value for a selected one of the WtPs.
Figure 10B:
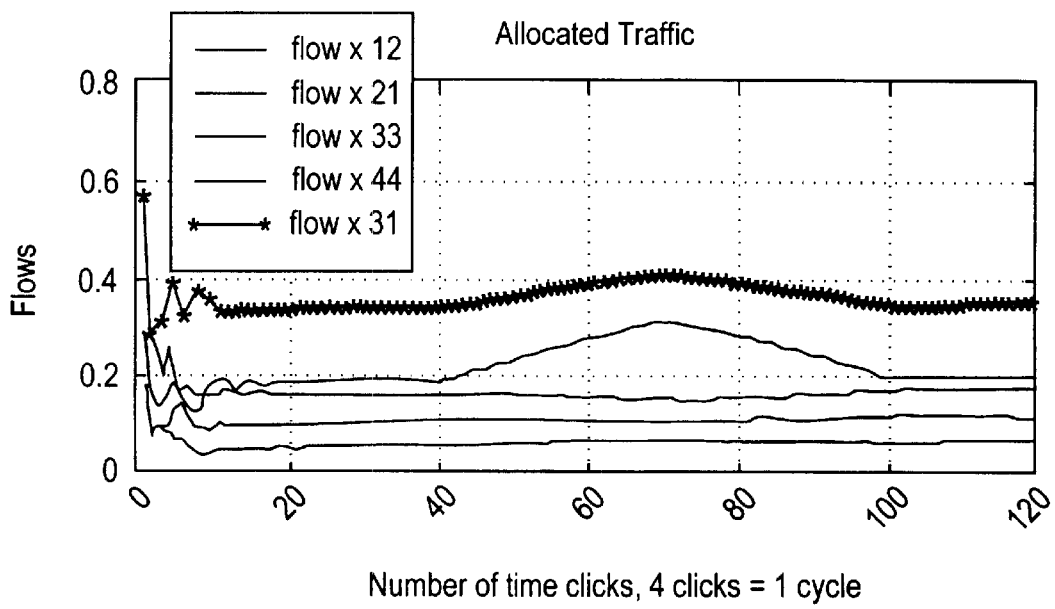

FIGS. 10(a) and (b) show the effect of ramping the WtP value for a selected one of the WtPs on one flow only. The WtP values are identical to those initially set for the simulated illustration in FIG. 9. In this case, WtP value $m_{44}$ is not changed from its initial value.

Figure 11:
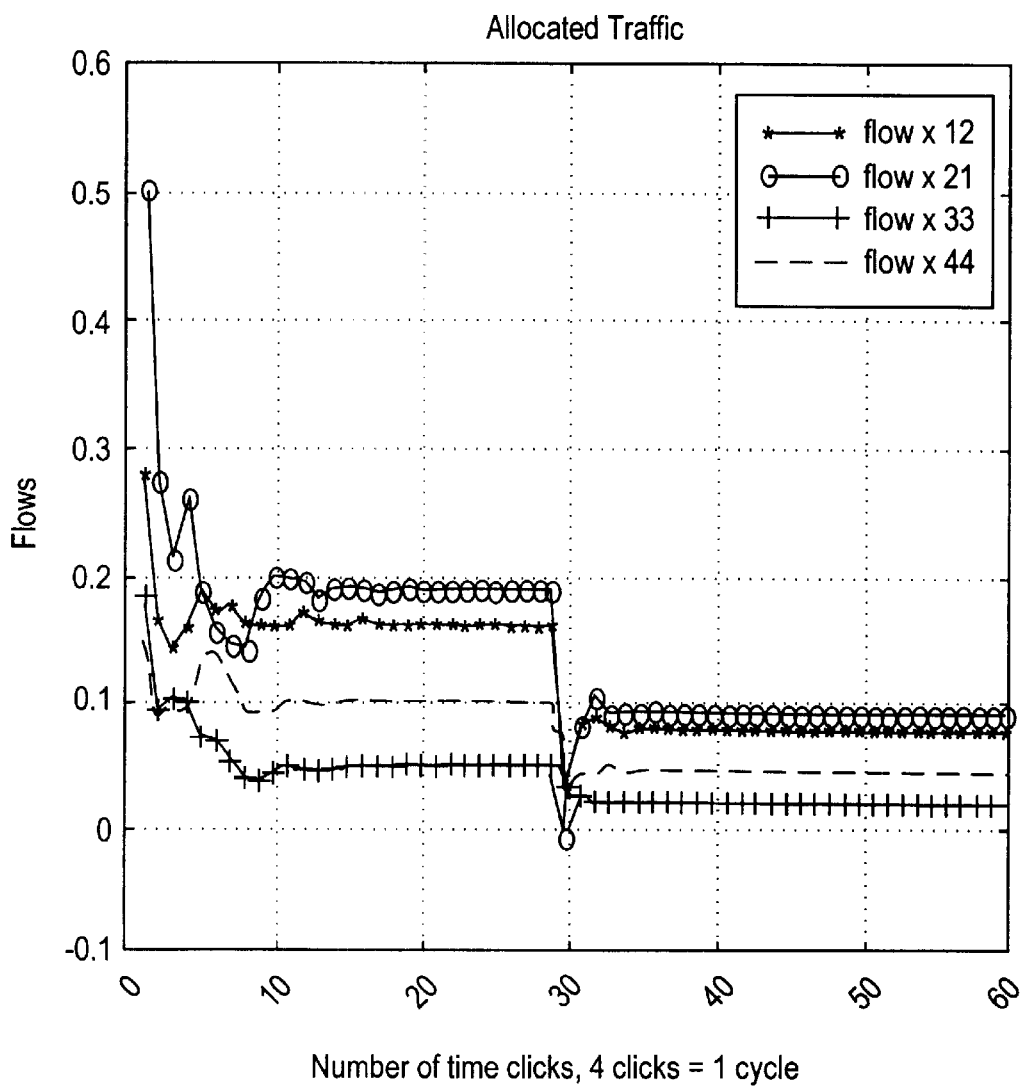
FIG. 11 is a graph illustrating simulated results for a four node unidirectional ring in which the capacity of all the resources (links) are halved at a point in time.

In FIG. 11, the capacity of all the links (resources) is changed from 1 unit to 0.5 units. The WtP values are identical to those initially set for the simulation illustrated in FIG. 9. All the flows are halved as would be expected.

Figure 12:
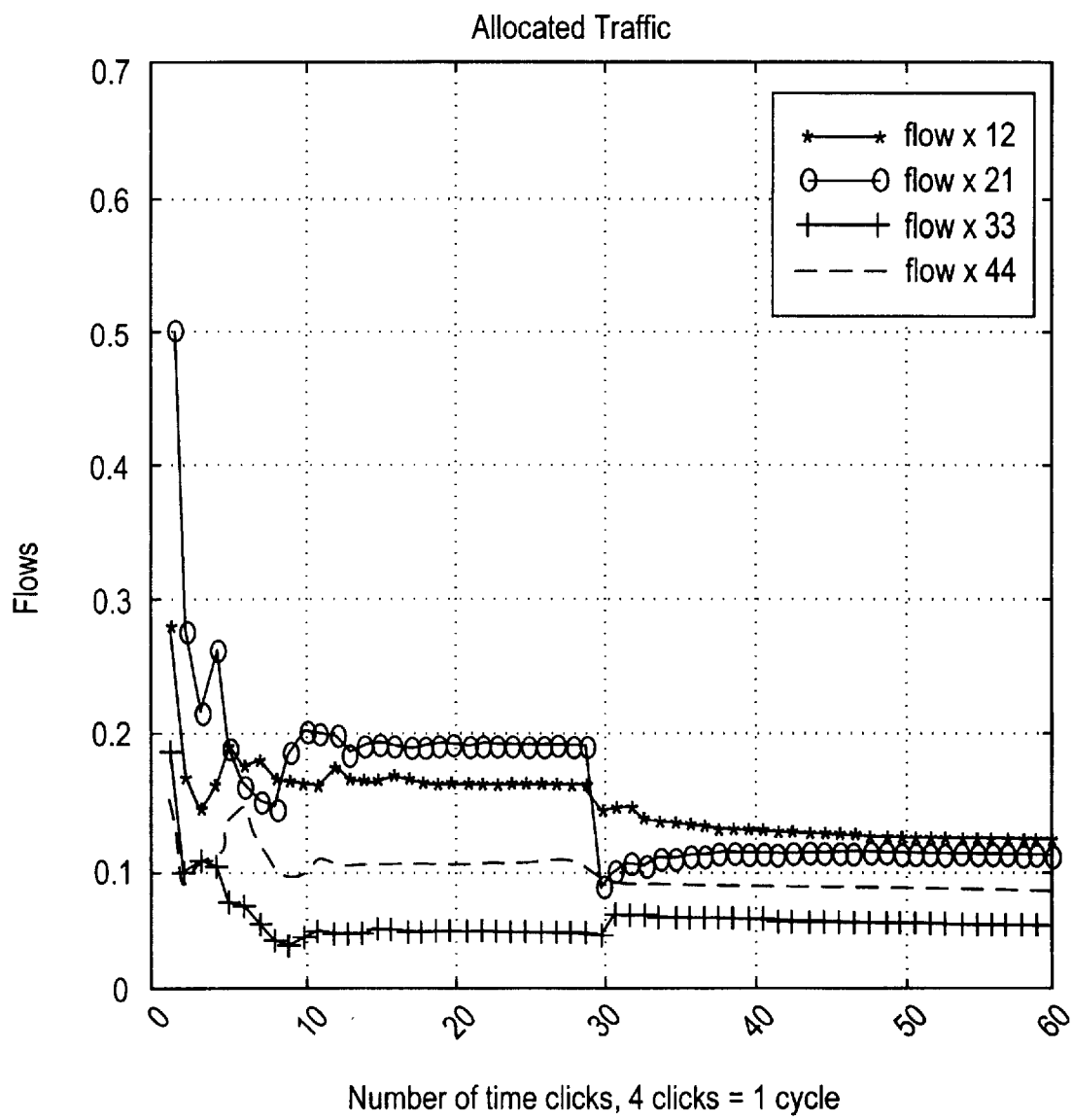
FIG. 12 is a graph illustrating simulated results for a four node unidirectional ring in which the capacity of one of the resources is changed at a point in time.

In FIG. 12, the capacity is changed from 1 units to 0.75 units at resource 2, while the others remain unchanged at 1 unit. The WtP values are identical to those initially set for the simulations illustrated in FIG. 9. It is interesting to note that since flow $x_{33}$ does not use resource 2, its flow increases whilst the other flows reduce. This result shows the benefit of using the proportional fairness concept in a network. It simulates for instance the unexpected loss of a quarter of the capacity on a link (e.g. link 2).

A major advantage of the methods of the invention is that since all bandwidth on the network is guaranteed, it is possible to mix real-time and delay sensitive traffic in the core network and be certain that there will be no excessive delays caused by heavily congested buffers. In an ATM network, the ATM switches or routers used only need buffers adequate for cell or packet scale congestion, not large burst or surge level since this is dealt with by a combination of edge buffering and just in time pre-negotiation of contracts for bandwidth.

Features of the two methods as afore described may be combined as appropriate and as would be apparent to a skilled person.

What is claimed is:

1. A method of dynamically allocating shared resources in a telecommunications network comprising a plurality of resources, comprising the step of:

for each resource providing a controller to allocate shares in said resource to users that will utilise said resource, said shares being allocated on the basis of the available capacity of the resource at a point in time and users' willingness to pay (WtP) values at said point in time, the available capacity of the resource being the actual capacity less the through traffic capacity at said point in time, wherein each controller allocates at each of a series of points in time the WtP values of each of the users making requests for resources at said controller between the resources needed to satisfy said requests for resources by said users by setting for each combination of resource and user the proportion of that user's WtP value to be allocated to that resource as being equal to the latest demand by all users for that resource known to the controller divided by the sum of the latest demands by all users for all resources needed to satisfy that user's request for resources known to the controller.

2. A method as claimed in claim 1, wherein each controller calculates at each of said points of time the relative demand on its associated resource by summing the total demand made on that resource by ingress traffic and the total demand made on the resource by through traffic divided by the actual capacity of the resource.

3. A method as claimed in claim 2, wherein the controller communicates its calculated relative demand information to other controllers.

4. A method as claimed in claim 3, wherein the controller communicates its calculated relative demand information to other controllers at each of said points of time.

5. A method as claimed in claim 4, wherein each controller recalculates at each of said points of time the relative demand for its associated resource from the updated WtP proportions and communicates the recalculated relative demand information to the other controllers.

* * * * *

UNITED STATES PATENT AND TRADEMARK OFFICE
CERTIFICATE OF CORRECTION

PATENT NO. : 6,556,548 B1
DATED : April 29, 2003
INVENTOR(S) : Kirkby et al.

It is certified that error appears in the above-identified patent and that said Letters Patent is hereby corrected as shown below:

Title page,
Item [30], Foreign Application Priority Data, delete "Aug. 7, 1919" and substitute -- Aug. 7, 1998 --

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO.    : 6,556,548 B1
DATED         : April 29, 2003
INVENTOR(S)   : Kirkby et al.

It is certified that error appears in the above-identified patent and that said Letters Patent is hereby corrected as shown below:

<u>Title page,</u>
Item [54], Inventors, third inventor's name should read -- Subramaniam Sabesan --.

Signed and Sealed this

Twentieth Day of September, 2005

JON W. DUDAS
*Director of the United States Patent and Trademark Office*